Feb. 25, 1936.   H. S. JANDUS   2,031,954
VEHICLE BUMPER
Filed April 15, 1930   2 Sheets-Sheet 1
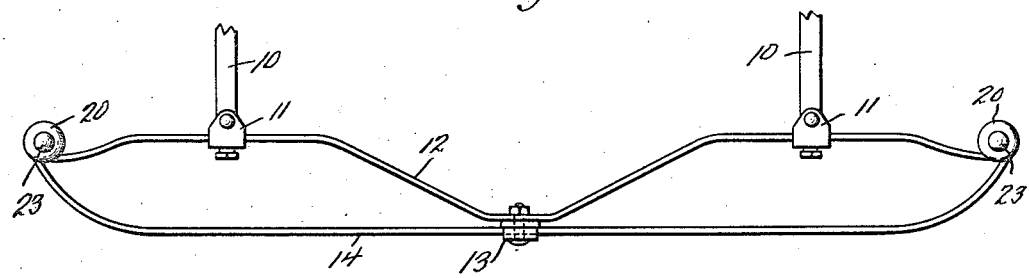
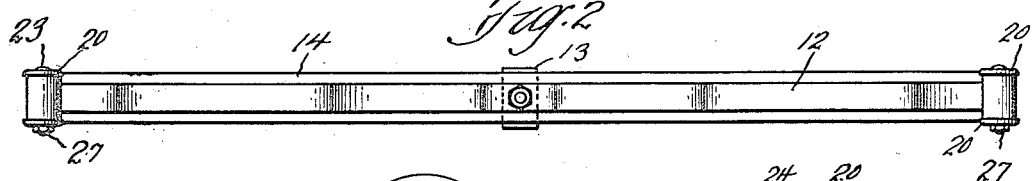
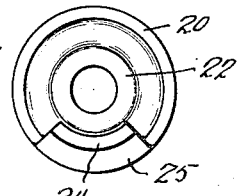
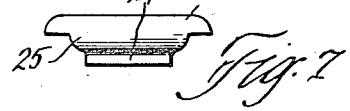
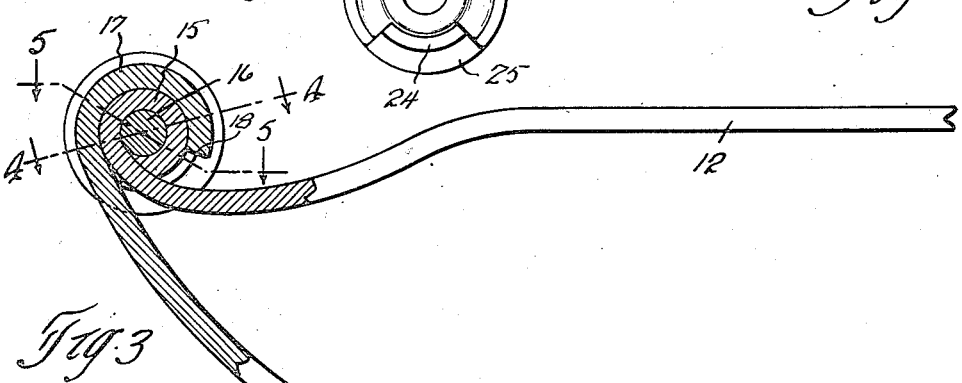
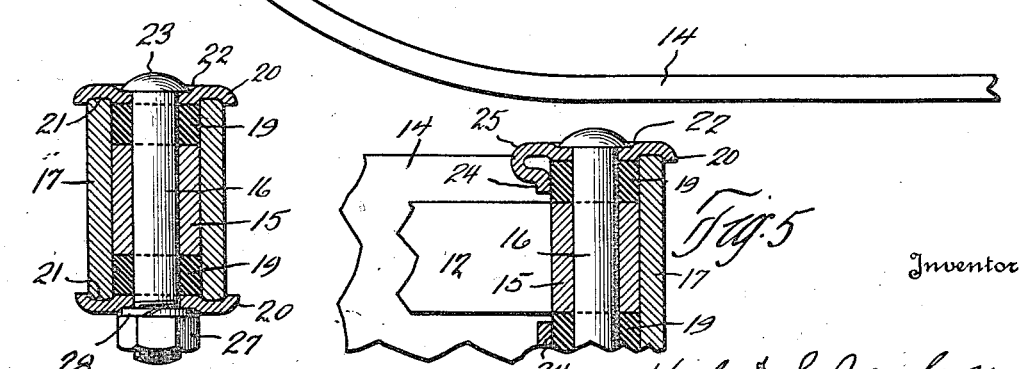
Inventor
Herbert S Jandus
By Hull Brock & West
Attorney Feb. 25, 1936.   H. S. JANDUS   2,031,954
VEHICLE BUMPER
Filed April 15, 1930   2 Sheets-Sheet 2
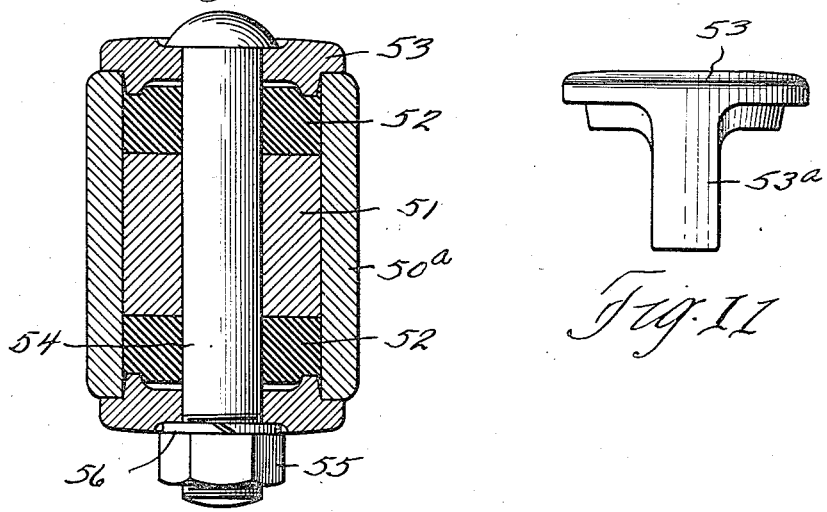
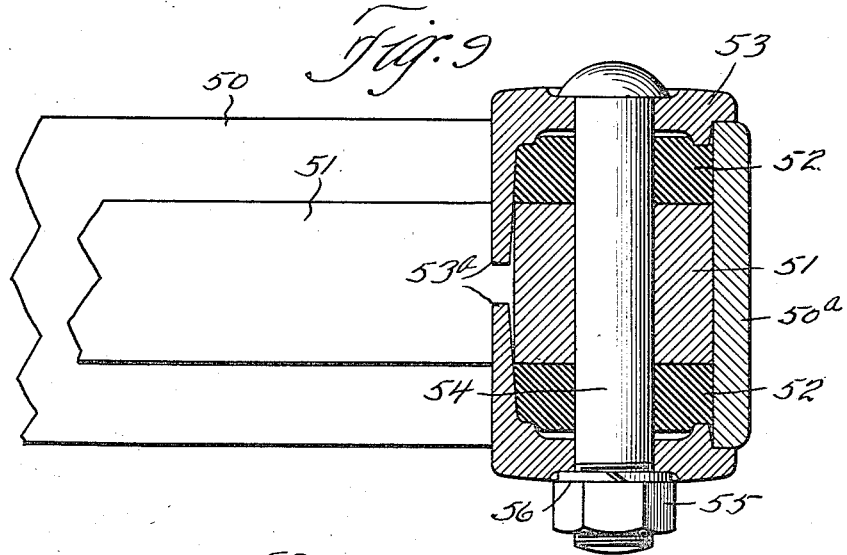
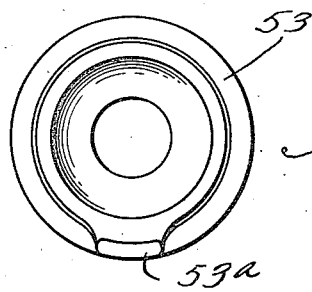

UNITED STATES PATENT OFFICE 2,031,954

VEHICLE BUMPER

Herbert S. Jandus, Detroit, Mich., assignor to General Spring Bumper Corporation, Detroit, Mich., a corporation of Michigan Application April 15, 1930, Serial No. 444,434

12 Claims. (Cl. 293—55)

This invention relates to a vehicle bumper and particularly to the structure involved in connecting the ends of the back bar and front or impact bar together whereby they may have a limited pivoting action due to flexures of the bars, but will normally remain fixed with respect to each other. The object of the invention is to provide such a structure which will be free from rattles, which will permit the connection of bars of different widths and which will permit of economy of manufacture and ease of assembly.

With the above and other objects in view, the invention resides in the details of construction and arrangement of parts hereinafter described and claimed.

Fig. 1 is a plan view of a bumper showing my improved construction in the position of use; Fig. 2 is a rear view of the structure shown in Fig. 1 with the attaching means omitted; Fig. 3 is a fragmentary sectional view taken horizontally substantially centrally of the bumper; Fig. 4 is a section on line 4—4 of Fig. 3; Fig. 5 is a section on line 5—5 of Fig. 3; Fig. 6 is a bottom plan view of one of the clamping washers; and Fig. 7 is an elevation thereof; Figs. 8 to 11, inclusive, are views of a modified form of the invention.

My invention relates particularly to the subcombination shown in Fig. 3, but is designed to be used in a complete bumper construction which is illustrated by that shown in Figs. 1 and 2, wherein the numerals 10 and 11 indicate portions of an automobile and attaching clamps, respectively. The back bar 12 is secured to the automobile frame members and attached to the front bar 14 by the improved end joining means shown in Fig. 3, and centrally by a clamp 13 of well known design.

In my improved construction the back bar 12 has the end thereof rolled into an eye 15 which is preferably bent into a closed circular shape adapted to receive a bolt 16. The front bar 14 is bent into a semi-eye 17 having the end 18 thereof spaced from the front bar to allow the back bar to project therebetween whereby a limited pivoting action is permitted. For the purpose of this specification, the spacing of the end 18 from the bar 14 to allow the back bar 12 to project therethrough and have limited pivotal movement therein is understood by the term "semi-eye" and the semi-eye shall have an extent somewhat more than a semi-circle whereby the eye 15 must be inserted axially into the semi-eye 17.

As is clear from the drawings, the back bar 12 is much narrower than the front bar 14, and I prefer to provide rubber spacing washers 19 of a size corresponding to that of the eye 15 to be placed within the semi-eye 17 for the purpose of spacing the back bar more or less centrally of the front bar and yieldingly holding the same in position. While I prefer to use rubber for the spacing washers 19, it is evident that other suitable material, such as leather, fiber or metal, may be employed more or less successfully. Clamping washers 20 are provided to engage the edges 21 of the semi-eye 17. These washers preferably have depressed central portions 22 to receive the bolt heads 23 and circular grooves to fit over the edges 21. These washers are also provided with skirts 24 adapted to substantially cover the portions of the rubber spacing washers 19 which would otherwise be exposed between the end 18 of the semi-eye and the front bar 14. As shown, these skirts are slightly spaced from the edges of the back bar whereby the cushioning effect of the spacing washers is not destroyed by engagement of the skirts 24 with the back bar. It is within the contempulation of my invention to provide the skirt 24 with a resilient portion corresponding to the bulge 25 and then allow the lower edge of the skirt to come into contact with the back bar 12 whereby a more nearly complete covering of the spacing washers 19 may be effected. The bolt 16 extends through the clamping washers 20, through the spacing washers 19 and through the eye 15, and has a nut 27 and lock washer 28 provided for clamping the assembly in operative relation.

In the modification illustrated in Figs. 8 to 11 inclusive a modified form of clamping washer is employed. The arrangement of this form comprises the front bar 50, the narrow back bar 51 together with rubber spacing washers 52 and the clamping washers 53 provided with integral skirts 53ª, all clamped together by means of the bolt 54 which is provided with the usual nut and lock washer 55 and 56. In this form the edge of the washer 53 is rabbeted as best seen in Figs. 8 and 9 whereby a portion extends into the semi-eye 50ª which is formed out of the front bar as in the first modification described. Extending from one side of the clamping washer 53 is the integral skirt 53ª which extends between the end of the semi-eye and the rear bar along the outer edge of the spacing washers 52 and eye 51. This form is preferable in many cases because of a neater appearance and the more complete masking of the rubber washers whereby dirt is excluded.

While I have shown and described illustrative embodiments of my invention, I wish it understood that I am not limited to the details shown, but may carry out my invention in numerous forms within the scope of the appended claims.

Having thus described my invention, what I claim is:

1. In a vehicle bumper, a front bar and a back bar, said back bar being narrower than said front bar, said back bar having an end thereof bent into an eye adapted to receive a bolt, said front bar having an end bent into a semi-eye in which said eye is received so that said eye and said semi-eye are substantially concentric, a rubber spacing washer also received in said semi-eye, clamping washers engaging the edges of said semi-eye, one of said clamping washers engaging said spacing washer, and a bolt passing through said eye and all said washers adapted to hold said clamping washers in clamping engagement with the edges of said semi-eye.

2. In a vehicle bumper, a front bar and a back bar, said back bar being narrower than said front bar, said back bar having an end thereof bent into an eye adapted to receive a bolt, said front bar having an end bent into a semi-eye in which said eye is received so that said eye and said semi-eye are substantially concentric, a rubber spacing washer received in said semi-eye on each side of said eye, clamping washers engaging the edges of said semi-eye and the outer edges of said spacing washers, and a bolt passing through said eye and said washers for clamping the parts in operative relation to each other.

3. In a vehicle bumper, a front bar and a back bar, said back bar being narrower than said front bar, said back bar having an end thereof bent into an eye adapted to receive a bolt, said front bar having an end bent into a semi-eye in which said eye is received so that said eye and said semi-eye are substantially concentric, a spacing washer received in said semi-eye on each side of said eye, clamping washers engaging the edges of said semi-eye and the outer edges of said spacing washers, and a bolt passing through said eye and said washers for clamping the parts in operative relation to each other, said clamping washers having skirts thereon extending toward each other between the end of said semi-eye and the front bar.

4. In a vehicle bumper, a front bar and a back bar, said back bar being narrower than said front bar, said back bar having an end thereof bent into an eye adapted to receive a bolt, said front bar having an end bent into a semi-eye in which said eye is received so that said eye and said semi-eye are substantially concentric, a rubber spacing washer received in said semi-eye on each side of said eye, clamping washers engaging the edges of said semi-eye and the outer edges of said spacing washers, and a bolt passing through said eye and said washers for clamping the parts in operative relation to each other, said clamping washers having skirts thereon extending toward each other between the end of said semi-eye and the front bar.

5. A vehicle bumper including front and back bars, the back bar having an eye, the front bar having an eye in which the first eye is received, clamping means engaging the edges of the second eye, resilient means spacing the first eye from said clamping means, and a device for holding the clamping means in engagement with said edges and said spacing means.

6. A vehicle bumper including front and back bars having telescoped eyes, spacing washers on opposite sides of one of said eyes and received in the other eye, clamping elements engaging the edges of said other eye and the outer edges of said spacing washers, said clamping elements having resilient skirts yieldably engaging the outer peripheral walls of said washers, and means passing through said eyes for clamping the various parts in operative relation to one another.

7. In a bumper construction, a front bar, a rear bar, said bars having nesting concentric eyes, a bolt assembly including a part passing through the eyes for maintaining said eyes in position, said rear bar eye being narrower than said front bar eye, and spacers in said bolt assembly compensating for the difference in the lengths of the eyes, said spacers comprising resilient elements clampingly exerting frictional forces against the edges of the rear bar eyes.

8. In a bumper construction, a front bar, a rear bar, said bars having nesting concentric eyes, a bolt assembly including a part passing through said eyes for maintaining said eyes in position, said rear bar eye being narrower than said front bar eye, and resilient elements and spacers adjacent said elements in said bolt assembly and cooperating with said rear bar eye to compensate for the difference in the lengths of said eyes, said elements clampingly exerting frictional forces against the edges of the rear bar eye.

9. In a bumper construction, a single impact bar, a rear bar narrower than said impact bar, said bars having concentrically assembled eyes with the narrower internal of the wider, spacing means comprising a resilient element engaging the narrower eye and compensating for the difference in the lengths of the eyes, and securing means including a bolt passing through the whole for holding the eyes in assembled relation, said securing means clamping said element into frictional engagement with an edge of the narrower eye.

10. In a bumper end construction, a front bar having an eye at its end, a slot in the inner side of said eye, a rear bar projecting through said slot, resilient blocks engaging the interior of said eye and the end of said rear bar, a bolt and nut, washers on said bolt, said bolt and nut cooperating to clamp said blocks in position.

11. In a bumper end construction, a front bar having an eye at its end, a slot in the inner side of said eye, a rear bar projecting through said slot, resilient blocks engaging the interior of said eye and the end of said rear bar, and means adapted to secure said blocks in position.

12. In a bumper construction, an impact bar having an eye provided with a slot extending along the eye from an edge thereof, a back bar having an eye of an outside diameter greater than the width of said slot and pivotally fitted in the first eye with an edge of the second eye spaced from an edge of the first eye, the back bar projecting from its eye through and being swingable in said slot upon relative pivotal movement of said bars, cushion means disposed in said impact bar eye and engaging the back bar eye to compensate for the space between said edges of said eyes, and means passing through said eyes for holding said eyes and cushion means in assembled relation.

HERBERT S. JANDUS.